United States Patent [19]
Krochta et al.

[11] Patent Number: 5,547,693
[45] Date of Patent: Aug. 20, 1996

[54] METHOD OF PRESERVING NATURAL COLOR ON FRESH AND MINIMALLY PROCESSED FRUITS AND VEGETABLES

[75] Inventors: John M. Krochta; Mikal Saltveit; Luis Cisneros-Zevallos, all of Davis, Calif.

[73] Assignee: The Regents of the University of California, Oakland, Calif.

[21] Appl. No.: 205,282

[22] Filed: Mar. 2, 1994

[51] Int. Cl.⁶ .............................. A23B 7/16; A23B 7/148
[52] U.S. Cl. ........................ 426/90; 426/102; 426/267; 426/268; 426/270; 426/308; 426/310; 426/415; 426/419
[58] Field of Search .................. 426/270, 268, 426/267, 262, 102, 310, 308, 419, 415, 90

[56] References Cited

U.S. PATENT DOCUMENTS

| | | | |
|---|---|---|---|
| 1,774,866 | 12/1930 | Beadle . | |
| 1,853,151 | 4/1932 | Segur et al. | 426/310 |
| 1,853,152 | 4/1932 | Segur et al. | 426/310 |
| 2,070,936 | 2/1937 | Trowbridge | 426/308 |
| 2,213,557 | 9/1940 | Tisdale et al. | 426/310 |
| 2,427,857 | 9/1947 | Hamill | 426/310 |
| 2,470,281 | 5/1949 | Allingham | 426/310 |
| 2,532,489 | 12/1950 | Ferguson | 426/308 |
| 2,619,424 | 11/1952 | Measure . | |
| 3,450,542 | 6/1969 | Badran | 426/419 |
| 3,450,543 | 6/1969 | Badran et al. | 426/415 |
| 3,450,544 | 6/1969 | Badran et al. | 426/415 |
| 3,533,810 | 10/1970 | Shillington et al. | 426/267 |
| 3,556,814 | 1/1971 | Whitman et al. | 426/310 |
| 3,669,691 | 6/1972 | De Long et al. | 426/102 |
| 3,895,119 | 7/1975 | Grom | 426/270 |
| 3,997,674 | 12/1976 | Ukai et al. | 426/310 |
| 4,011,348 | 3/1977 | Farrier et al. | 426/310 |
| 4,338,342 | 7/1982 | Tan et al. | 426/308 |
| 4,670,275 | 6/1987 | Orr | 426/270 |
| 4,696,824 | 9/1987 | Meczkowski et al. | 426/102 |
| 4,818,549 | 4/1989 | Steiner et al. | 426/270 |
| 4,855,153 | 8/1989 | Orr et al. | 426/270 |
| 4,919,948 | 4/1990 | Orr et al. | 426/106 |
| 4,946,694 | 8/1990 | Gunnerson et al. | 426/102 |
| 4,960,600 | 10/1990 | Kester et al. | 426/310 |
| 5,198,254 | 3/1993 | Nisperos et al. | 426/310 |
| 5,346,712 | 9/1994 | Cherry et al. | 426/321 |

OTHER PUBLICATIONS

Avena–Bustillos, R. J., Cisneros–Zevallos, L. A., Krochta, J. M., Saltveit, M. E., Optimization of Edible Coatings on Minimally Processed Carrots Using Response Surface Methodology, *Transactions of the ASAE*, vol. 36(3):801–805.

Bolin, H. R., and Huxsoll, C. C., Control of Minimally Processed Carrot (*Daucus carots*) Surface Discoloration Caused by Abrasion Peeling, *Journal of Food Science*, vol. 56(2):416–418, (1991).

Den Outer, R. W., Discolorations of Carrot (*Daucus carota L.*) During Wet chilling Storage, *Scientia Horticulturae*, vol. 41:201–207, (1990).

Subchapter B—Food for Human Consumption, Part 170—Food Additives, §170.3 Difinitions, 21 CFR, Chapter 1, pp. 4, 6, 7, (Apr. 1, 1993 Edition).

Subchapter B—Food for Human consumption, Part 184—Direct Food Substances Affirmed As Generally Recognized As Safe, §184.1187 Calcium alginate., §184.1191 Calcium carbonate., §184.1193 Calcium chloride., §184.1199 Calcium gluconate 21 CFR, Chapter 1, pp. 425–427, 444,445, (Apr. 1, 1993 Edition).

*Primary Examiner*—Steven Weinstein
*Attorney, Agent, or Firm*—Townsend and Townsend and Crew LLP

[57] ABSTRACT

The present invention relates to a method for reducing surface discoloration caused by white blush development on fresh and minimally processed vegetables and fruits due to dehydration

19 Claims, 3 Drawing Sheets

METHOD OF PRESERVING NATURAL COLOR ON FRESH AND MINIMALLY PROCESSED FRUITS AND VEGETABLES

FIELD OF THE INVENTION

The present invention relates to a method for reducing surface discoloration caused by white blush development on fresh and minimally processed vegetables and fruits due to dehydration

BACKGROUND OF THE INVENTION

The appearance of fresh produce is of significant importance to the consuming public. Fresh and especially minimally processed fruits and vegetables are susceptible to surface dehydration. The dehydration often results in a noticeable whitening of the surface of the produce that the consumer identifies with a lack of freshness. Traditional polysaccharide coatings such as starch products do not significantly prevent this problematic discoloration.

An objective of this invention is to provide edible coatings that are capable of maintaining the necessary water concentrations to prevent whitening due to surface dehydration.

SUMMARY OF THE INVENTION

This invention provides for methods of preserving the natural color of fresh or minimally processed vegetables and fruits by applying an edible hygroscopic coating of either a hygroscopic salt or a lower alkyl polyhydric alcohol and storing the coated vegetable or fruit in a gas permeable plastic container capable of maintaining an internal humidity of between 90 and 100%.

Preferred hygroscopic salts are $CaCl_2$, $MgCl_2$, NaCl and KCl. Preferred lower alkyl polyhydric alcohols are glycerol, polyglycerol, propylene glycol, sorbitol, mannitol 10 and polyethylene glycol 6000. The hygroscopic material is preferably applied as an aqueous solution having a final concentration of between 0.5% and 5.0% by weight.

Preferred gas permeable plastics are low-density polyethylene, high-density polyethylene, polypropylene, and polyvinyl chloride.

Preferred vegetables to which the method is best applied are carrots, turnips, radishes, sweet potatoes, leeks and celery. Preferred fruits are bell pepper, peppers, Italian squash and zucchini squash.

This invention further provides for packages comprising a container capable of maintaining an internal relative humidity of between 90 and 100% said container containing water vapor in a concentration of between 90 and 100% of saturation of the air in the container and at least one of a vegetable and fruit having a surface and being disposed within said container, said surface of at least one of the vegetable and fruit being coated with a hygroscopic salt, lower alkyl polyhydric alcohol or combination thereof said salt or alcohol present in an amount sufficient to prevent discoloration of the surface due to loss of water. The preferred humidity level is 95% to 100%. Any of the above mentioned vegetables or fruit may be placed within the container and the preferred coatings and plastics are as stated above.

DEFINITIONS

Figure 1:
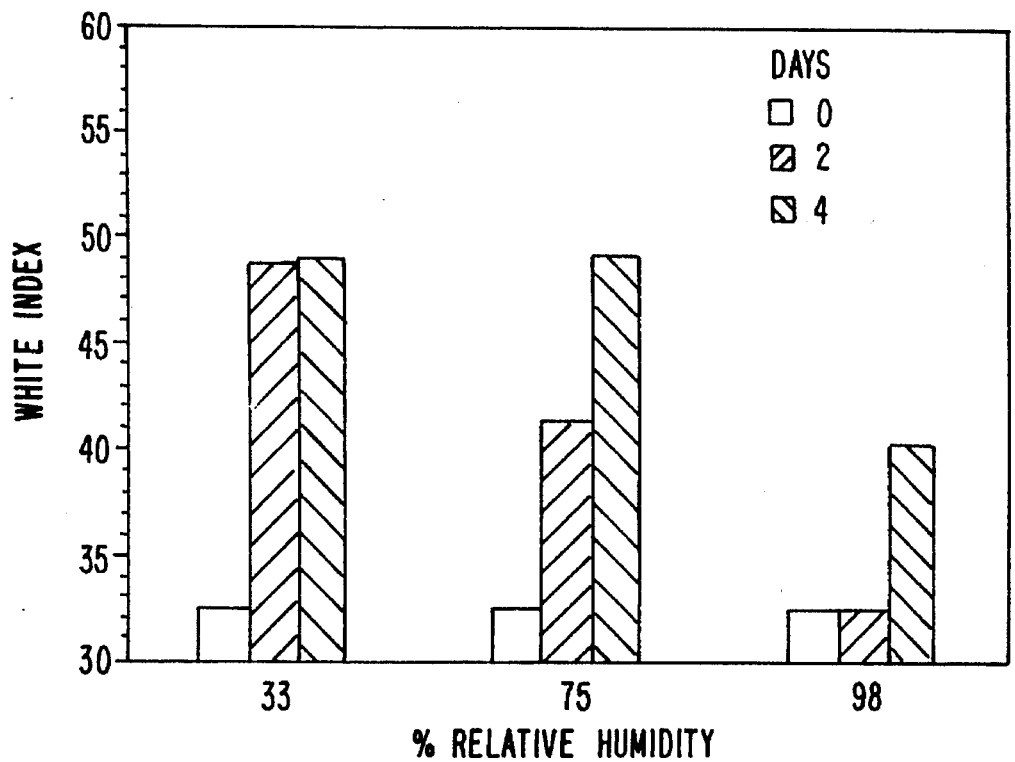
FIG. 1. illustrates the effect of relative humidity on White Index for untreated (control) peeled carrots stored at 10° C.

The term "hygroscopic" describes hydrophilic substances that absorb water from their surroundings. In the current invention, the hydrophilic materials in combination with high humidity perform as humectants, preventing water loss when in contact with the surface of non-cooked vegetables and fruits.

The term "lower alkyl polyhydric alcohols" refers to non-substituted straight chain alcohols having between 1 and 6 carbons and more than one hydroxy (OH) group. Examples are propylene glycol, mannitol, sorbitol and glycerol. The alcohols can be either in a monomeric or polymeric form.

The phrase "minimally processed" refers to the processing of non-cooked vegetables and fruits that result in exposed fresh surfaces that will dehydrate and discolor. Such processing may include one or a combination of the following: the removal of dirt by way of cleaning and washing, the removal of the outside layers by means such as peeling or scraping, or the production of conveniently sized pieces by way of cutting, slicing or dicing.

The phrase "gas permeable plastic" refers to plastics that allow gases to pass but have a low water vapor permeability. Examples are, low-density polyethylene (LDPE), high-density polyethylene (HDPE), polypropylene, and polyvinyl chloride.

The term "apply" describes methods used to cover the vegetable or fruit with a thin film of hygroscopic material and includes spraying or misting, and dipping or submerging. In addition, the vegetable or fruit may be rolled through a shallow solution of the hygroscopic material.

The phrase "natural color" is the color obtained after cleaning, washing, peeling, scraping, cutting, slicing or dicing non-cooked fresh vegetables and fruits.

DETAILED DESCRIPTION

In the present invention, the white blush that develops due to dehydration from the surface of fresh and minimally processed vegetables and fruits is reduced by using a combination of novel coatings and high humidity. The following description will provide details of the coatings, means for insuring high humidity conditions, and means for determining the effectiveness of such coatings. Vegetables and fruits treated by this method maintain a fresh and natural appearance far longer than untreated vegetables and fruits. The method is particularly applicable to the preparation of ready-to-eat raw vegetables or fruits sold as snack foods or appetizers. Such goods are typically supplied and maintained in a convenient packaging made of low water vapor permeable plastic.

Discoloration due to white development is caused by surface dehydration of the outer layers. The claimed method reduces surface dehydration by applying small amounts of an aqueous hygroscopic material to the surface of fresh or minimally processed vegetables and fruits and maintaining the treated produce at a relative humidity of between 90% and 100%, preperably at 95% to 100%.

The invention can be applied to any fruit or vegetable that typically discolors due to water loss from the surface. Examples of vegetables include: carrots, turnips, radishes, sweet potatoes, leeks, broccoli and celery. Examples of fruits include: bell peppers, peppers, and squash.

White Blush discoloration occurs on surfaces that are readily susceptible to dehydration. Such surfaces can result after cleaning and washing as is commonly done with vegetables that grow in the soil such as carrots, turnips, radishes, sweet potatoes and leeks. In addition, white blush discoloration can develop on the freshly exposed surfaces of fruits and vegetables that have been peeled and sliced.

The coatings have the ability to absorb and hold water user conditions of high humidity and in so doing maintain a high surface moisture for prolonged periods of time. The coatings are typically hygroscopic salts and lower alkyl polyhydric alcohols. Hygroscopic salts include $CaCl_2$, $MgCl_2$, NaCl, and KCl, with $CaCl_2$ the most preferred. Lower alkyl polyhydric alcohols include propylene glycol and glycerol with propylene glycol most preferred. The coatings are applied as aqueous solutions that can be between 0.3 and 3.0% by weight where hygroscopic salts are used or between 0.5 and 5.0% by weight where a lower alkyl polyhydric alcohol is used.

To apply the coating one can use any of several means commonly employed in the food processing industry, as for example, by spraying or dipping. It is important that the means used to apply the coating be efficient in contacting all surfaces intended to be coated.

It is recommended that any excess water on the surface of the processed vegetables and fruits be removed prior to applying the coating to insure the applied coating has the intended concentration. Methods for removing excess water include, centrifugation, draining, and blowing with air.

Maintaining the coated vegetables and fruits at a high relative humidity of between 90% and 100% over a prolonged period of time is important to preventing white blush. This can be achieved using materials that are gas permeable and have a low water vapor permeability, preferably a plastic material. Examples of such plastics are, low-density polyethylene (LDPE), high-density polyethylene (HDPE), polypropylene, and polyvinyl chloride. Ideally, sealed bags of the plastic material would be used to store and maintain the coated vegetables and fruits.

Measuring changes in color due to white blush formation during storage of vegetables and fruits are evaluated using a chromameter such as the Minolta CR200 chromameter (Minlota Camera Co., Japan). Before each session of color measurements the chromameter is calibrated with a tile having a color standardized to the vegetable or fruit being evaluated, i.e., carrots would require a standard orange tile, bell peppers would require a standard green, yellow or red tile, depending on the variety and maturity of the bell pepper. The whitish index (W.I.) is estimated according to the following equation derived by Judd, D. B., 1963, *Color in Business, Science and Industry*, 299–300, New York, John Wiley and Sons, incorporated herein by reference, $$W.I.=100-\sqrt{(100-L)^2+a^2+b^2},$$

where the determination of L, a and b are further described by Hunter in *Food Preservation by Moisture Control*, ed. C. C. Seow, 199–219. London: Elseview Applied Science Publ. Co., incorporated herein by reference.

To establish conditions of defined relative humidity for the tests one can follow procedures using mixtures of saturated salt solutions as outlined in Standard Practice for *Maintaining Constant Relative Humidity by Means of Aqueous Solutions*, Annual Book of ASTM Standards, Designation:E:104–185 (1985), incorporated herein by reference. Relative humidity can be measured by several means known in the art. For example, by measuring with a model MPM 2000 hygrometer made by Solomat, Glenbrook Industrial Park, Stamford, Conn. 06906.

The following examples are provided by way of illustration only and not by way of limitation. Those of skill will readily recognize a variety of noncritical parameters which could be changed or modified to yield essentially similar results.

EXAMPLES

The following materials and methods were used to illustrate the beneficial combination of hygroscopic coatings and high relative humidity. Separate aqueous solutions of 3% by weight polyhydric alcohols were made with Propylene glycol USP (Texas Chemical Co., Texas), D-sorbitol (Fisher, N.J.), and glycerol (Fisher, N.J.). An aqueous solution of 2% by weight hygroscopic salt was made with calcium chloride (Fisher, N.J.). All solutions were prepared using tap water and mixing with a magnetic stirrer for 10 min at room temperature.

Peeled carrots were obtained from a commercial processing plant in Bakersfield, Calif., shipped over night under crushed ice in insulated containers and stored at 2.5 C. Peeled carrots of the same size (5 cm long) and weight (12–16 g) were used. Dewatering of the peeled carrots in preparation for applying the coatings was done using centrifugation.

Materials of low water vapor permeability are illustrated with low density polyethylene (LDPE) plastic bags (area size: 14.5 cm×15 cm×2 or 435 $cm^2$) with an average water vapor permeability of $9.41×10^{-6}$ g $kpa^{-1}$ $h^{-1}$ $m^{-1}$ at 20 C. and 1.5 mil thickness.

Color measurements were taken with a Minolta Chromameter model CR200 (Minolta Camera Co., Japan) determining L, a and b from the CIE (Commission Internationale de l'Eclairage) color scale (Gardner Laboratory, Inc., 1975, A1, *Appearance Measurements*, 1–3). Calibration was to a standard orange tile (L=70.10, +a=18.23, +b=32.02). Results were expressed as White Index (W.I.) according to Judd, suprs., and applied to peeled carrots according to the technique of Bolin, H. R. and C. C. Huxsoll, 1991, *J. Food Sci.*, 56(2):416–418.

To obtain a relationship between white index and visual appearance, as shown in Table 1, peeled carrots were grouped into different levels of viable white development and measured with the Minolta Chroma-meter. From this the following relation between visual appearance and white index was made: a non visible white has a W.I. of 31.8±2.1, a slightly white has a W.I. of 35.1±3.0, and a moderate white has a W.I. of 40.7±4.4. Higher values indicated that the peeled carrots had reached their storage limit life.

Conditions of defined relative humidity (RH) were obtained according to ASTM methods as described in "Standard Practice for Maintaining Constant Relative Humidity by Means of Aqueous Solutions", Annual Book of ASTM, Designation:E (1985). Briefly, the effect of relative humidity (RH) is studied by storing the treated carrots inside hermetic chambers equilibrated at constant defined RH with saturated salt solutions at 10° C. Relative humidity was measured using a Solomat hygrometer.

Example 1

Comparative Study on the Effect on White Blush Formation on Peeled Carrots Between D-sorbitol, Glycerol and Propylene Glycol in Combination with High Relative Humidity An experiment that mimics real practices was designed in the following manner. Peeled carrots were sprayed with 3% aqueous solutions of polyhydric alcohol. For the control, peeled carrots were sprayed with water. An amount of carrots equivalent to 250 g was placed in LDPE plastic bags and placed at 10° C. in a storage room under constant relative humidity of 70–80% and air velocity of 20 m min$^{-1}$. An average white index measurement was derived from measuring between 10 and 20 carrots from each treatment on days 0, 14 and 19.

The results in Table 2 show that with a 3% aqueous solution of propylene glycol significantly reduced the W.I. increase over time, when compared to the control. After 19 days of storage in LDPE bags at 10 C., these carrots still have a moistened appearance and a significantly lower W.I. than untreated carrots. The same effect was obtained with glycerol and sorbitol, which have similar hydrophilic characteristics. The control with initial excess surface water reached a W.I. of 37.4, corresponding to a value between slightly and moderate white as shown in Table 1.

Example 2

The Effect on White Blush Formation on Peeled Carrots with Different Relative Humidities and Application of Propylene Glycol Peeled carrots were studied using a model system where relative humidity could be accurately measured. In this case, glass chambers were used for the relative humidity study. They were held at 10° C. at three different relative humidities: 33.5, 75.7 and 98.2%, obtained from saturated salt solutions of MgCl$_2$ (Fisher, N.J.), NaCl (Fisher, N.J.) and K$_2$SO$_4$ (Fisher, N.J.), respectively. A Solomat hygrometer was used to measure the relative humidity initially. The mixtures of saturated salt solutions were made as follows: MgCl$_2$ (500 g salt/62.5 cc water), NaCl (500 g salt/150 cc water) and K$_2$SO$_4$ (500 g salt/273 cc water). Each chamber was provided with a fan which was used for short periods right after opening and closing the lid when color measurements were done to re-equilibrate the chamber. The experiments were performed without air movement to simulate real conditions inside a plastic packaging system. Treated carrots were sprayed with a polyhydric alcohol aqueous solution, while the control carrots were sprayed with water. Carrots were placed on a metal screen above the saturated salt solution (2.5 cm), avoiding any contact between carrots. Each data point was the average white index measurement taken on ten carrots.

Figure 2:
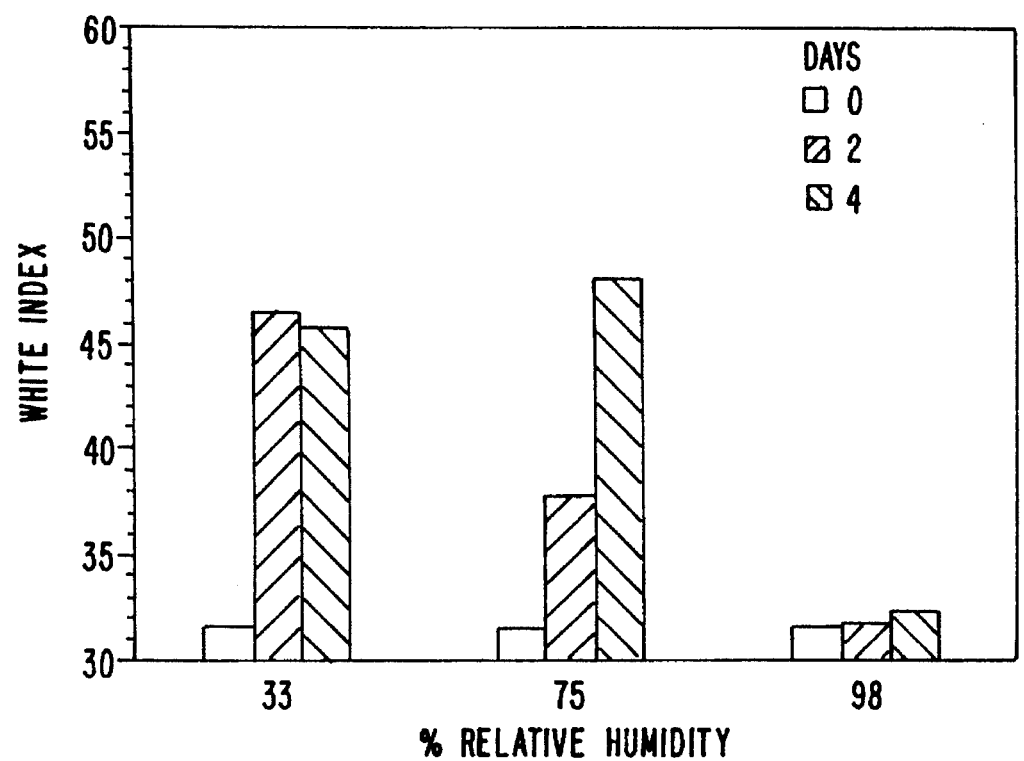
FIG. 2. illustrates the effect of relative humidity on White Index for peeled carrots coated with propylene glycol and stored at 10° C.
Figure 3:
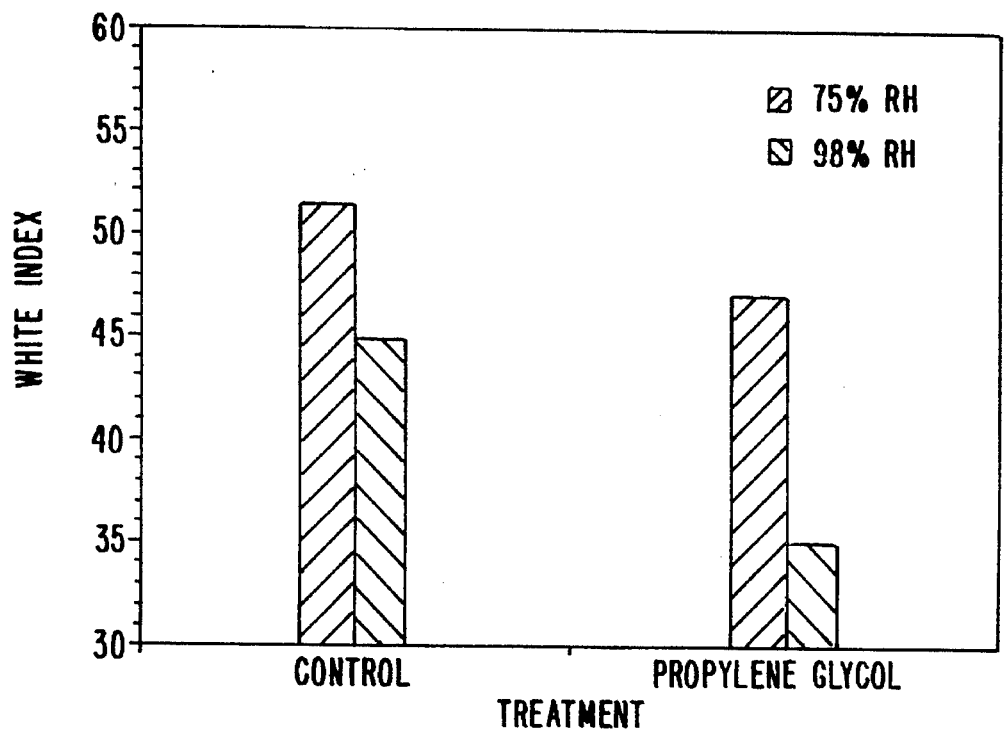
FIG. 3. illustrates the effect of relative humidity on White Index for peeled carrots after 6 days at 10° C.

When propylene glycol was applied to carrots and exposed to different relative humidities at 10 C., the following effects were observed. By day 2, in the range 33.5% to 98.2% RH, both control (FIG. 1) and treated carrots (FIG. 2) were the same showing a high W.I value with a RH of 33.5% and 75.7%, and a low W.I. at 98.2% RH. By day 4, carrots treated with propylene glycol had a lower W.I. at 98.2% RH compared to control peeled carrots. With decreased % RH, the moisture adsorptive capacity of the propylene glycol also decreased, holding less water on the surface and giving a higher W.I. value and thus a dry appearance comparable to the control. By day 6, carrots with propylene glycol had lower W.I. at 98.2% RH compared with the control (FIG. 3). Illustrating the importance of high humidity, the lower 75.7% RH showed that the W.I. of carrots treated with propylene glycol was similar to the control.

Example 3

The Effect on White Blush Formation on Peeled Carrots Coated with 2% Calcium Chloride in Combination with High Relative Humidity Peeled carrots were studied using a model system where relative humidity was set to approximate 100% RH. Preparation was done by placing tap water in glass chambers and holding at 10° C. Each chamber was provided with a fan which was used for short periods right after opening and closing the lid when color measurements were done to re-equilibrate the chambers. The experiments were performed without air movement to simulate real conditions inside the plastic packaging system. Ten peeled carrots were used for each treatment as replicates. Treated carrots were dipped for 1 minute in the aqueous solution while the control carrots were dipped in tap water. Carrots were placed over a metal screen on the saturated salt solution (2.5 cm), avoiding any contact between carrots.

Figure 4:
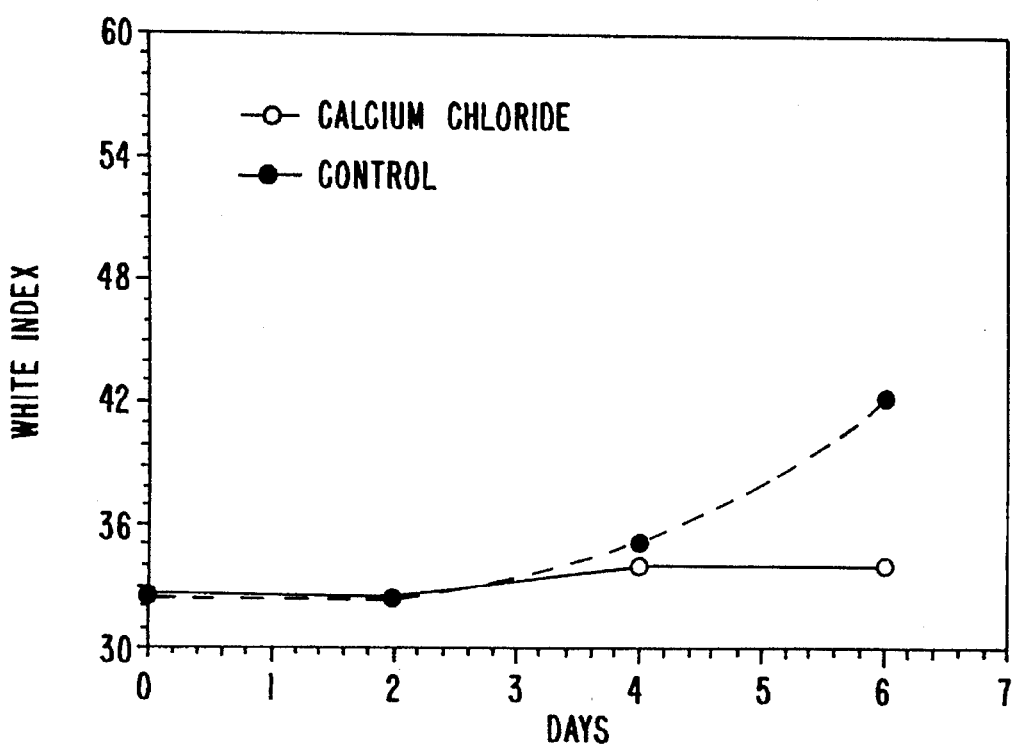
FIG. 4. illustrates the effect of a 2% calcium chloride coating on White Index color change for peeled carrots stored at 10° C. and 100% relative humidity.

When carrots were treated with an aqueous solution of calcium chloride and exposed to a high relative humidity, the white development was not observed (FIG. 4). After 6 days of storage, treated carrots had W.I. comparable to that at the beginning of the experiment, while control carrots reached a higher value of W.I. This result is related to the ability of the salt to absorb water, thus reducing the dry appearance of the carrots surface during storage.

Example 4

Comparative Study on the Effect on White Blush Formation on Sliced Bell Pepper Between D-sorbitol, Glycerol and Propylene Glycol in Combination with High Relative Humidity This study follows the procedure described in example 1 but with sliced bell peppers. The bell peppers are sliced in a manner that produces relatively uniform pieces, as for example, by cutting the fruit from stem end to apex end forming longitudinal pieces having tapered ends. Such slices of bell peppers are commonly sold as convenience foods in the local grocery store. The slices are sprayed with 3% polyhydric alcohol. Water is used as the control. An amount of sliced bell peppers equivalent to 250g are placed in LDPE plastic bags and placed at 10° C. in a storage room under constant relative humidity of 70–80% and air velocity of 20 m min$^{-1}$. An average white index measurement (made as described above) is derived by measuring between 10 and 20 slices from each treatment on days 0, 14 and 19.

By comparing over the course of 19 days the average W.I. for each polyhydric alcohol with the control, one is able to measure the decrease formation of white blush formation on sliced bell peppers.

Example 5

The Effect over Time on the Color Change on Peeled Carrots Coated with 3% Propylene Glycol and Stored in LDPE bags at 10° C.

Figure 5:
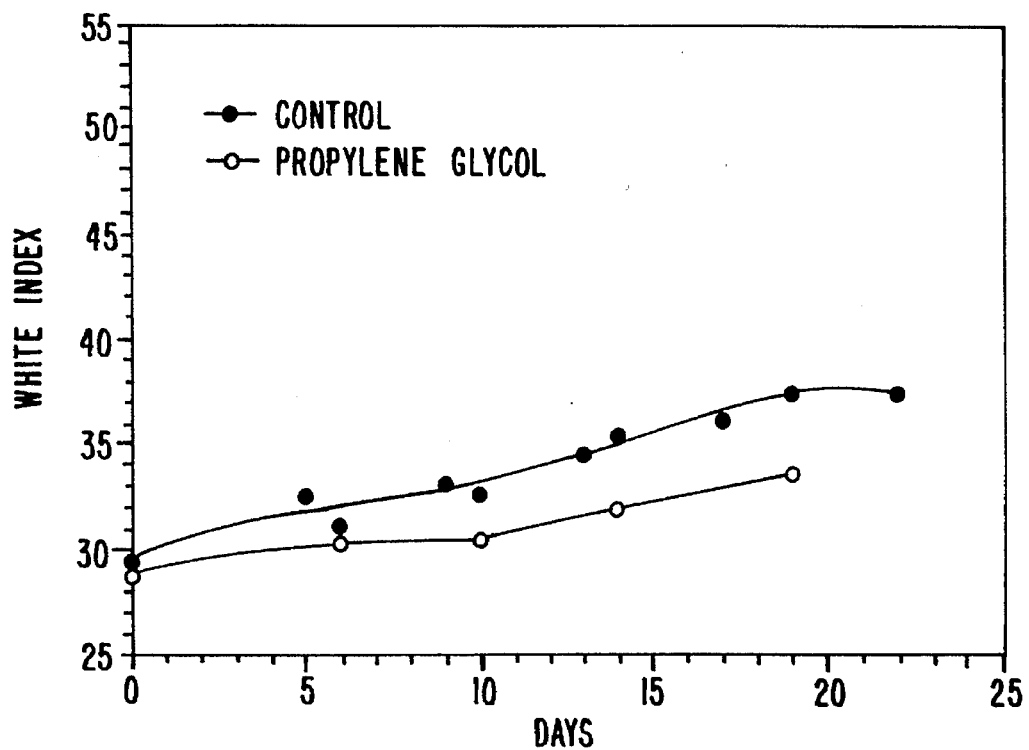
FIG. 5. illustrates the change in the White Index of peeled carrots coated with 3% propylene glycol and stored in LDPE bags at 10° C.

The results that are illustrated in FIG. 5 were obtained using the experimental procedure described in Example 1. A 3% aqueous solution of propylene glycol was prepared using tap water and sprayed on the peeled carrots. The coated carrots were placed in LDPE bags and stored at 10° C. The control consisted of peeled carrots sprayed with tap water. An average white index measurement was derived from measuring between 10 and 20 carrots from each time point.

Example 6

The Effect of Three Different Polysaccharide Coatings on the Color Change on Peeled Carrots Stored in LDPE Bags at 10° C.

The experimental procedure for this Example is identical to that described in Example 1. The peeled carrots were sprayed with the polysaccharide coatings. Solutions of 3% Crisptex, 3% Sta-Mist 7415 and 3% Semperfresh were made using tap water. The control consisted of peeled carrots sprayed with tap water. Each data point was the average white index measurement taken on ten carrots.

Crisptex is manufactured by American Maize-Products Company, Hammond, Ind. The composition of Crisprex is described as a modified food starch with a base starch content high in amylose, having a moisture content of 10%, a pH of 5.5 and a Brookfield viscosity of 1:1 as measured in a Model LVF at 12 RPM and 200 cps.

Sta-Mist starch, #7415 is manufactured by A. E. Staley MFC. Co., Decatur, Ill. The composition of Sta-Mist is described as a modified food starch with a base starch content of lipophilic modified waxy corn starch, having a moisture content of 11%, a pH of 5.7 and a minimum hydration temperature of 140° C.

Semperfresh is manufactured by Inoteck International Corporation, Painesville, Ohio. The composition of Semperfresh is described as a blend of sodium carboxymethyl cellulose, sucrose esters and mixed mono- and di-glycerides. The sucrose esters are not more than 5% with an acid value not exceeding 5, moisture not exceeding 4%, softening points between 46°–65° C. and HLB values of 2–15. The sodium carboxymethyl cellulose has a moisture content not more than 10%, an active content minimum of 98.5%, a salt content as NaCl not more than 1.5% and pH of a 1% solution of between 6–8. The mono- and di-glycerides have a total mono-ester content minimum of 40%, a free glycerol content not more than 1.5%, a moisture content not more than 2%, an acid value maximum of 0.8%, a soap content (as sodium stearate) maximum of 1%, a peroxide value maximum of 3% and a normal iodine value of 45.

Figure 6:
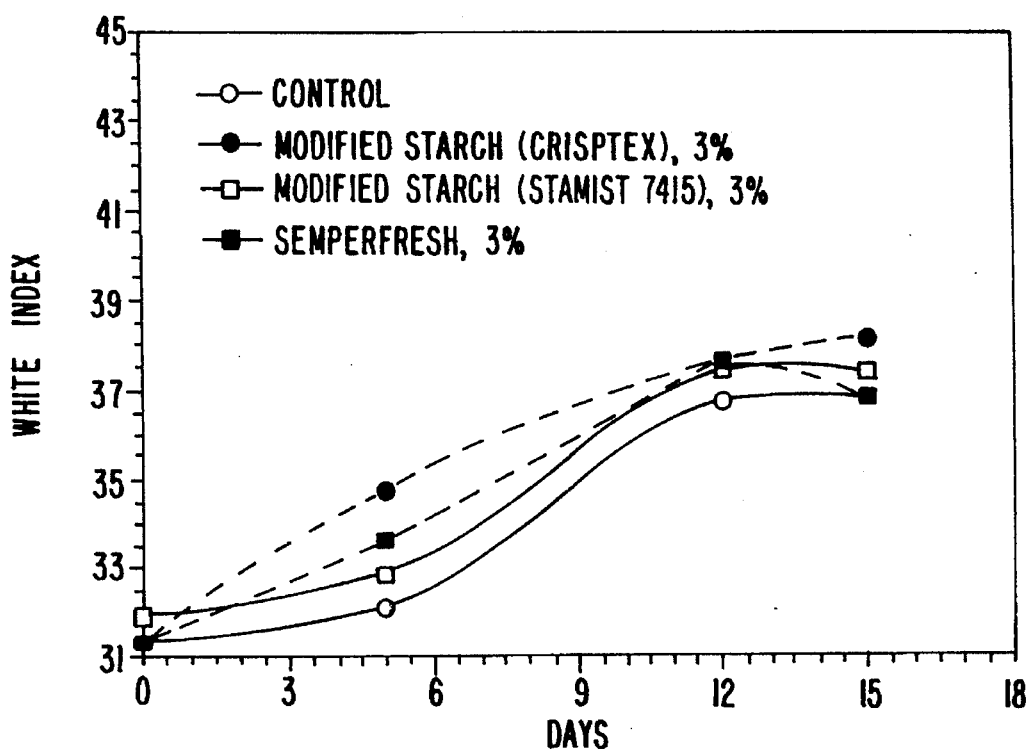
FIG. 6. illustrates the change in the White Index of peeled carrots coated with polysaccharide coatings and stored in LDPE bags at 10° C.

The results in FIG. 6 illustrate that none of the three polysaccharides tested gave any improvement in slowing white blush development when compared to the control where the peeled carrots are coated with tap water.

TABLE 1

A visual description of white index values for peeled carrots

| Description | White Index (W.I.) | sample size(n) |
|---|---|---|
| Non white. 0% white surface. | 31.8 ± 2.1 | 30 |
| Slightly white. 25% white surface. | 35.1 ± 3.0 | 16 |
| Moderate white. 50% white surface. | 40.7 ± 4.4 | 15 |
| Severe white. 75% white surface. | 48.6 ± 4.1 | 12 |
| Extreme white. 100% white surface. | 56.8 ± 1.4 | 9 |

TABLE 2

Effect of hydrophilic materials on white index for peeled carrots stored in LDPE bags at 10° C.

| Treatments | Days of storage | | |
|---|---|---|---|
| | 0 | 14 | 19 |
| Polyhydric alcohols: | | | |
| D-sorbitol | 29.6 | 32.8 | 34.7 |
| Glycerol | 29.7 | 32.9 | 33.8 |
| Propylene glycol | 28.8 | 31.8 | 32.3 |
| Control | 29.5 | 35.4 | 37.4 |

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A method of preventing white blush and preserving the natural color of either a fresh or minimally processed vegetable or fruit by applying to the surface of either the vegetable or fruit an edible hygroscopic coating selected from the group consisting of hygroscopic salts and lower alkyl polyhydric alcohols and sealing the coated vegetable or fruit in a gas permeable plastic container capable of maintaining an internal relative humidity of between 90 and 100%; said coating of salts and alcohols being present in an amount sufficient to prevent white blush discoloration of the surface of the vegetable of fruit due to loss of water from said surface.

2. The method of claim 1 wherein said vegetable is selected from the group consisting of carrots, turnips, radishes, sweet potatoes, leeks and celery.

3. The method of claim 2 wherein said vegetable is carrot.

4. The method of claim 1 wherein said fruit or vegetable is selected from the group consisting of bell pepper, peppers, Italian squash and zucchini squash.

5. The method of claim 4 wherein said fruit or vegetable is bell pepper.

6. The method of claim 1 wherein said hygroscopic salts and polyhydric alcohols are applied as an aqueous solution.

7. The method of claim 6 wherein said hygroscopic salts are selected from the group consisting of $CaCl_2$, $MgCl_2$, NaCl, and KCl.

8. The method of claim 7 wherein said hygroscopic salt is $CaCl_2$.

9. The method of claim 6 wherein said hygroscopic salts has a concentration of between about 0.5% and 5% by weight.

10. The method of claim 6 wherein said lower alkyl polyhydric alcohols are selected from the group consisting of glycerol, polyglycerol, propylene glycol, sorbitol, mannitol and polyethylene glycol 6000.

11. The method of claim 10 wherein said polyhydric alcohol is sorbitol.

12. The method of claim 6 wherein said polyhydric alcohol has a final concentration of between about 0.5% and 5% by weight.

13. The method of claim 1 wherein said gas permeable plastic is selected from the group consisting of low-density polyethylene, high-density polyethylene, polypropylene, and polyvinyl chloride.

14. The method of claim 13 wherein said gas permeable plastic is low-density polyethylene.

15. A package comprising:

a gas permeable plastic container capable of maintaining an internal relative humidity of between 90 and 100%, said container containing water vapor in a concentration of between 90 and 100% of saturation in the air of said container and a fresh or minimally processed vegetable or fruit having a surface and being disposed within said container, said surface of said vegetable or fruit being coated with either a hygroscopic salt, or a lower alkyl polyhydric alcohol, or a combination thereof, said salt or alcohol or combination thereof being present in an amount sufficient to prevent white blush discoloration of said surface due to loss of water from said surface.

16. A package of claim 15 wherein the vegetable is a carrot.

17. A package of claim 15 wherein the coating is an hygroscopic salt.

18. A package of claim 15 wherein the coating is lower alkyl polyhydric alcohol.

19. A package of claim 15 wherein the container is a gas permeable plastic selected from the group consisting of low-density polyethylene, high-density polyethylene, polypropylene and polyvinyl chloride.

* * * * *